United States Patent [19]
McCrabb et al.

[11] Patent Number: 5,339,632
[45] Date of Patent: Aug. 23, 1994

[54] METHOD AND APPARATUS FOR INCREASING THE EFFICIENCY OF INTERNAL COMBUSTION ENGINES

[76] Inventors: James McCrabb, 121 W. 3rd St., West Liberty, Iowa 52776; Jerald R. Gregg, R.R. 2, Box 51, Holcombe, Wis. 54745

[21] Appl. No.: 991,958
[22] Filed: Dec. 17, 1992
[51] Int. Cl.⁵ ............................................. F01K 23/10
[52] U.S. Cl. ................................... 60/618; 60/604
[58] Field of Search ................ 60/604, 606, 616, 618

[56] References Cited

U.S. PATENT DOCUMENTS

| | | | |
|---|---|---|---|
| 3,998,053 | 4/1976 | Gamell | 60/618 |
| 4,300,353 | 11/1981 | Ridgway | 60/618 |
| 4,366,674 | 1/1983 | Eakman | 60/618 |
| 4,586,338 | 5/1986 | Barrett et al. | 60/618 |
| 4,593,525 | 6/1986 | Mezger | 60/606 |
| 4,901,531 | 2/1990 | Kubo et al. | 60/618 |
| 4,996,845 | 3/1991 | Kim | 60/618 |

FOREIGN PATENT DOCUMENTS 0428261  4/1935  United Kingdom ................ 60/618

*Primary Examiner*—Richard A. Bertsch
*Assistant Examiner*—Charles G. Freay
*Attorney, Agent, or Firm*—James C. Nemmers

[57] ABSTRACT

This invention relates generally to a system for increasing the thermodynamic efficiency of internal combustion engines. In the system of the invention, the unused heat generated during normal engine operation in the exhaust gases, lubricating oil and engine coolant is utilized to compress air which produces additional energy that performs additional work in the engine system by means of a modified Rankine cycle. This same system used to maximize efficiency and increase power also acts to reduce pollutants in the exhaust emissions.

19 Claims, 4 Drawing Sheets

METHOD AND APPARATUS FOR INCREASING THE EFFICIENCY OF INTERNAL COMBUSTION ENGINES

BACKGROUND OF THE INVENTION

Internal combustion engines have developed into highly reliable prime movers for transportation as well as stationary applications. Engines based on the Otto cycle and the Diesel cycle have shown to be very durable, inexpensive to produce and until recently, inexpensive to operate. Until the 1973 oil shortage, the internal combustion engine was fueled almost exclusively by seemingly unlimited supplies of low cost petroleum derived fuel. This permitted the internal combustion engine to be made available in virtually any size with relatively high power output being obtained by increasing the amount of fuel input and cylinder displacement. This trend resulted in internal combustion engines which became increasingly wasteful from a thermodynamic standpoint. This increased waste of available British Thermal Units (B.T.U.'s) only began to gain significance when the cost of petroleum based fuels began to rise. Moreover, since the mid 1960's environmental concerns expressed by both the public and governmental agencies have resulted in increasingly stringent regulations on the amount of unburned hydrocarbons and oxides of nitrogen emitted by the typical internal combustion engine. Further, U.S. Government Corporate Average Fuel Economy (CAFE) regulations have required all automobile manufacturers to decrease average fuel usage of the typical automobile engine. Industry has responded to these regulations by adding to engines many complex and expensive methods to decrease average fuel usage and to reduce harmful emissions.

Primarily because of the foregoing, the automotive industry has found that it is no longer feasible to increase the cylinder size of the engine and fuel input in order to gain a desired power output, and attempts to solve the problem have resulted in a trade-off between additional fuel economy and lowered emissions. The net result has been a reduction in reserve horsepower available for many engine applications. Furthermore, the trend appeared to be toward increasingly complex and expensive methods of improving horsepower without an increase in fuel input.

Recently, however, efforts have been made to design engine systems which directly address the traditional thermodynamic inefficiency by utilizing the vast quantity of waste heat (up to 60% of available B.T.U.'s) normally dissipated to the environment to supplement the power output of the engine. At best, the mechanical power output of a conventional diesel cycle based engine is in the range of thirty to forty-two percent of the rate at which energy is released through the combustion of the fuel. The bulk of the remaining energy is lost to the environment through the exhaust gases and the engine jacket cooling system and its condenser. A system which can take lost heat and use it in the engine without great mechanical losses can double the power output or efficiency of a standard internal combustion engine. Examples of prior art systems which attempt to utilize this lost heat energy are Ridgeway U.S. Pat. No. 4,300,353, Eakman U.S. Pat. No. 4,366,674, and Kubo et al U.S. Pat. No. 4,901,531. Each of these patents, as well as other prior art teachings, attempt to redress the well-known thermodynamic losses through a recapture system. In such systems, the heat content of either the exhaust gases or engine coolant or both are used to vaporize a liquid which is then used to supplement engine output through various mechanical modifications to the engine system. All such systems, however, have one or more of the following disadvantages:

(a) The system is bulky and complex thereby adding significantly to the cost of the engine.

(b) The system requires extensive modification of the normal internal combustion engine. For example, one or more of the engine cylinders are dedicated strictly for utilizing recaptured energy thereby reducing the engine output through normal combustion processes.

(c) The system uses some type of turbine or supplemental drive train requiring reduction gears in order to add the recaptured power to the drive train, again adding significant cost and reducing the utility and reliability of the entire engine system.

(d) At low engine output levels the heat content of exhaust gases is relatively low, and the amount of energy recaptured is therefore low and does not justify the use of a recapture system. Moreover, during these low output times the system components serve as a significant drag on the overall engine system.

Thus, it is an object of the present invention to provide an improved system for recovering and utilizing the heat energy produced during operation of the engine so as to supplement the engine output or reduce fuel consumption at a constant power output level.

It is a further object of the invention to provide an improved system for recovering and utilizing the heat energy produced during operation of the engine while leaving the engine unaltered and functioning in a normal manner at low power levels or when the recapture system is rendered nonfunctional by operator choice or system failure.

An additional object of the invention is to utilize an exhaust afterburner and regulated air fuel mixture in such a way to recover unburned chemical energy in the exhaust gases and substantially eliminate all combustible pollutants.

SUMMARY OF THE INVENTION

In an engine constructed according to the principles of the invention, the conventional engine is modified by routing a liquid, such as the preheated engine coolant, to a boiler unit served by an exhaust gas fed afterburner. The afterburner receives the exhaust gases from the exhaust ports of each engine cylinder in a conventional manner and completes the burning process by mixing additional air, and, at certain power output levels, additional fuel. The heated exhaust gases are then directed to the boiler where the preheated coolant is boiled and the resultant vapor is superheated. This superheated vapor is then passed at high pressure into an air compressor which creates quantities of compressed air in direct ratio to the pressure of the superheated engine coolant. The air thus compressed is routed to a holding tank and then precisely metered into the individual combustion chambers of rotary or two or four cycle engines during either the intake stroke or the power stroke, or both, in such a way as to increase the mean effective pressure in the combustion chamber. In a two cycle engine, the power stroke is used as the sole power injection stroke. Compressed air may also be used in a two cycle engine as scavenging air to increase post combustion efficiency.

Upon discharge of the coolant vapor from the air compressor unit it is returned to the condenser/radiator of the type normally used by the internal combustion engine system. The liquid engine coolant is then routed to the engine jackets for reheating by the oil cooler and cylinder jackets thus closing the engine coolant loop. In an air-cooled engine, the liquid used to produce the superheated vapor is circulated in a closed system separate from the engine.

DESCRIPTION OF THE PREFERRED EMBODIMENT OF THE INVENTION

Figures 1, 1A:
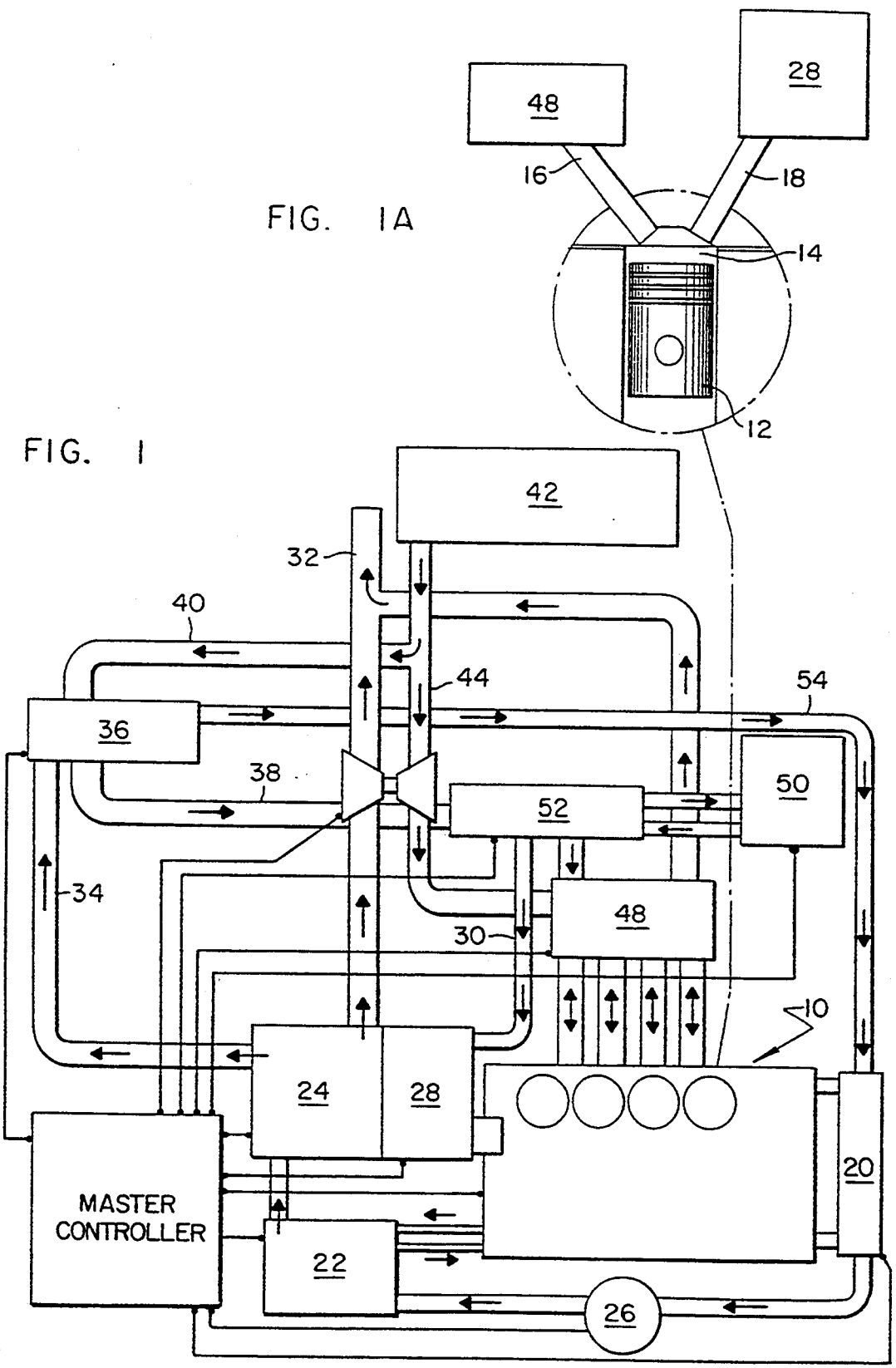
FIG. 1 is a schematic diagram of a system showing a preferred embodiment of the invention as used with a conventional liquid cooled internal combustion engine.
Figure 1C:
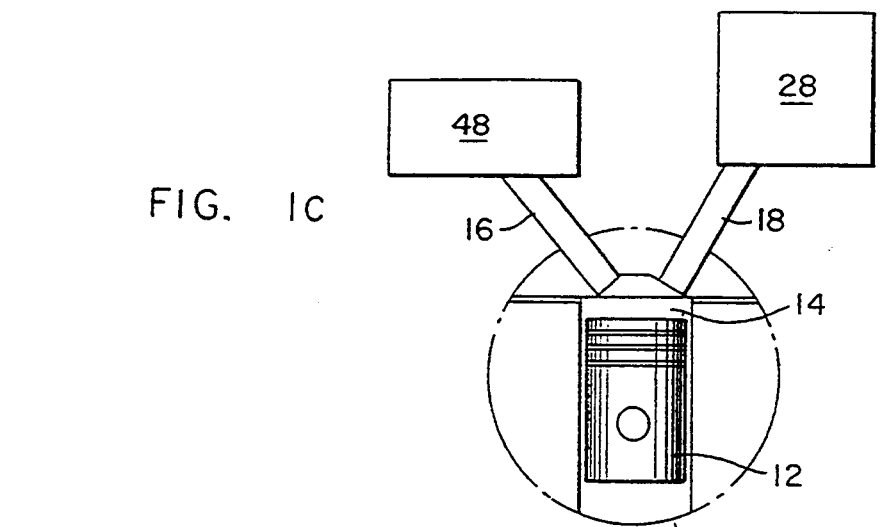
Figure 1B:
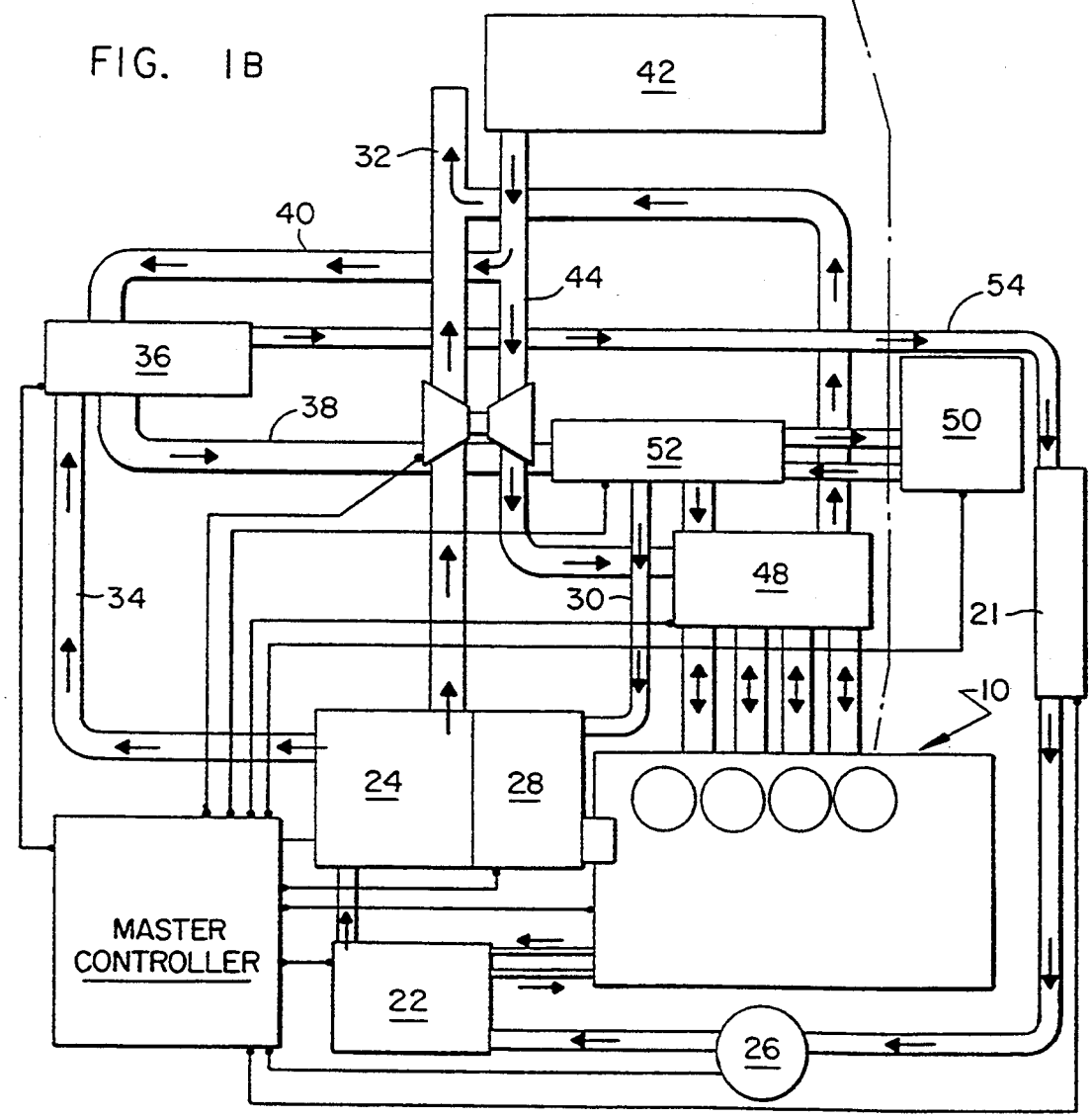

Referring now to FIG. 1, there is shown an integrated internal combustion engine/Rankine cycle system in accordance with a preferred embodiment of the invention for recovering and utilizing energy normally dissipated to the atmosphere in the form of medium and low grade heat resulting from operation of the engine system.

The system of the invention is for use with an internal combustion engine 10 of any well known design which has a mechanical output through a conventional drive shaft (not shown). The term internal combustion engine is used herein to designate any engine, Otto, diesel, rotary, or other wherein combustion takes place in a combustion chamber, such that the products of combustion, together with any other byproducts, perform work by exerting force on a moving surface from which the mechanical output is obtained from the engine.

As is well known to those skilled in the art, one form of the internal combustion engine is the piston engine which has a plurality of cylinders, usually four or more, in each of which there is a reciprocating piston 12. It should be understood, however, that even though the invention is described as applied to a piston engine, that the principles of the invention are equally applicable to rotary engines and also turbines. In the piston type engine, the area above the reciprocating piston and defined by the walls of the cylinder is the combustion chamber 14, which has an intake port 16 and an exhaust port 18. In the conventional engine, the intake port 16 and exhaust port 18 may be combined with a manifold that directs the intake air and exhaust gases into and out of the combustion chamber 14 of each cylinder through intake and exhaust valves (not shown). Also, as is well known to those skilled in the art, the fuel is injected into the combustion chamber by a fuel injector (not shown).

It is also well known to those skilled in the art that in an liquid-cooled internal combustion engine the heat created from the combustion of the fuel in the combustion chambers 14 is in part transferred into a coolant that is circulated through the engine block into and through a radiator 20. In a typical internal combustion engine, operation of the engine produces medium grade heat (800°–1600° F.) from the exhaust gases and low grade heat (200°–400° F.) from the lubricating oil and the engine block. Much of this heat is transferred into the engine coolant and absorbed in the radiator 20 as well as an oil cooler 22. Both the radiator 20 and oil cooler 22 are state of the art equipment, and are usually part of a conventional internal combustion engine 10. The engine coolant, which serves as the working fluid, may be one of a variety of fluids normally used as engine coolant. Commonly, this is a mixture of water and ethylene glycol. Such fluids have good specific heat properties and other properties required of conventional engine coolants, and these coolants will also handle the high heat levels of the afterburner 28 without thermal degradation.

With the system of the invention, there is combined with the conventional engine 10 a heat exchanger 24. Hot exhaust gases are discharged from the combustion chambers 14 through the exhaust ports 18 normally into a conventional exhaust manifold (not shown) and eventually are discharged into the atmosphere. As is well known to those skilled in the art, depending upon the design and efficiency of the engine 10, the exhaust gases contain a considerable amount of unburned fuel, a number of gases resulting from the combustion process, and a considerable amount of heat. Federal and state regulations in recent years have imposed restrictions on the amount and type of emissions that are permitted to be discharged into the atmosphere, and engine and vehicle designers and manufacturers have therefore responded to these governmental regulations with a variety of means, such as catalytic convertors, to make certain the emissions will be within the required limits.

In the schematic of FIG. 1 which illustrates the basic components of the system of the invention, there is not shown a conventional exhaust manifold, but whether through a manifold or directly from the combustion chambers 14 the exhaust gases from the engine 10 are discharged into the heat exchanger 24. It should be understood however that the conventional exhaust manifold can be modified and preferably fully insulated with the exhaust gases from the engine 10 being discharged from the manifold into the heat exchanger 24. In either event, the heat exchanger 24 is preferably fully insulated from the environment to improve its efficiency.

Excess heat from the oil cooler 22 is transferred into the engine coolant being circulated through the cooler 22 by pump 26, with the coolant also being circulated through the heat exchanger 24 so as to utilize the heat energy from the hot oil. This also has the advantage of minimizing the back pressure created by the recapture process of the invention.

The heat exchanger 24 also preferably includes an afterburner 28 into which the exhaust gases from the engine 10 are introduced and mixed with air from an intake line 30. The exhaust gases from engine 10 will usually be at a temperature in the range of 900°–1500° F., and the gases will contain significant quantities of unburned fuel. By mixing these gases with air provided through intake line 30, the unburned fuel will burn in the afterburner 28 and thus greatly reduce the amount of nitrous oxides and other hydrocarbons discharged through exhaust line 32 into the atmosphere. Such additional burning of the exhaust gases in afterburner 28 may eliminate the need for additional treatment of these gases in a catalytic convertor or other device before discharge into the atmosphere.

Furthermore, and equally important, the post combustion burning in the afterburner 28 raises the temperature of the exhaust gases to a temperature in the range of 1900°–2300° F. when the engine 10 is under full load. As needed by engine demands, additional fuel may be introduced directly into the afterburner 28 to increase the temperatures of the exhaust gases. Further as necessary, a conventional spark or glow plug (not shown) may be placed in the afterburner 28 and fired using the ignition system of the engine 10 or by a separate ignition system in diesel or other non-spark engines.

The raising of the temperature of the exhaust gases by burning of the unburned fuel in the afterburner 28 provides additional heat to the heat exchanger 24. The engine coolant that is circulated through the engine 10 and radiator 20 is pumped by pump 26 through the oil cooler 22 where the coolant absorbs additional heat from the hot lubricating oil passing through cooler 22. The hot lubricating oil is usually at a temperature of approximately 375° F., and the coolant entering the oil cooler 22 is usually at a temperature in the range of 200°–230° F. The amount of heat absorbed by the coolant during passage through the oil cooler 22 will be dependent upon a number of factors. However, it is estimated that 2100 BTU's per minute can be absorbed from the oil cooler 22 with a six cylinder engine operating under normal load.

The engine coolant which has now been preheated by passing through the oil cooler 22 is passed into the heat exchanger 24 where the coolant absorbs additional heat from the exhaust gases discharged from afterburner 28. The heat exchanger 24 will convert the coolant into super-heated steam under pressures up to 1200 psi which then flows through steam line 34 into an air compressor 36 of any conventional design. The steam drives the air compressor 36 so as to produce compressed air in high pressure line 38 at pressures of 400–1200 psi, for example. Atmospheric air is supplied to the air compressor 36 through an intake line 40 after passing through an intake air filter 42. Such filters 42 are common in internal combustion engines to supply the combustion air to the engine 10. In FIG. 1, the combustion air is supplied directly to the engine 10 through air intake line 44. As illustrated in FIG. 1, a conventional turbo charger 46 may be included in the system. In either event, both the compressed air in the high pressure air line 38 and the air flowing through air intake line 44 are introduced into the engine 10 through an intake air controller 48 in a manner more fully described hereinafter. In addition, an air storage tank 50 is included in the system to serve as a holding tank for the compressed air in line 38 until the air is needed by the engine 10. Flow to and from the air storage tank 50 is controlled by a compressed air controller 52. The air storage tank 50 also serves to dampen surges which might be created by the air compressor 36 and to store air when the high pressure air is not needed. Also, during acceleration when additional high pressure air is needed, it can be supplied from the storage tank 50 and thus eliminate lag. This is all more fully described hereinafter. The steam utilized by the air compressor 36 is spent and discharged from the air compressor 36 through a return line 54 which carries the condensate back to the radiator 20.

Figure 2:
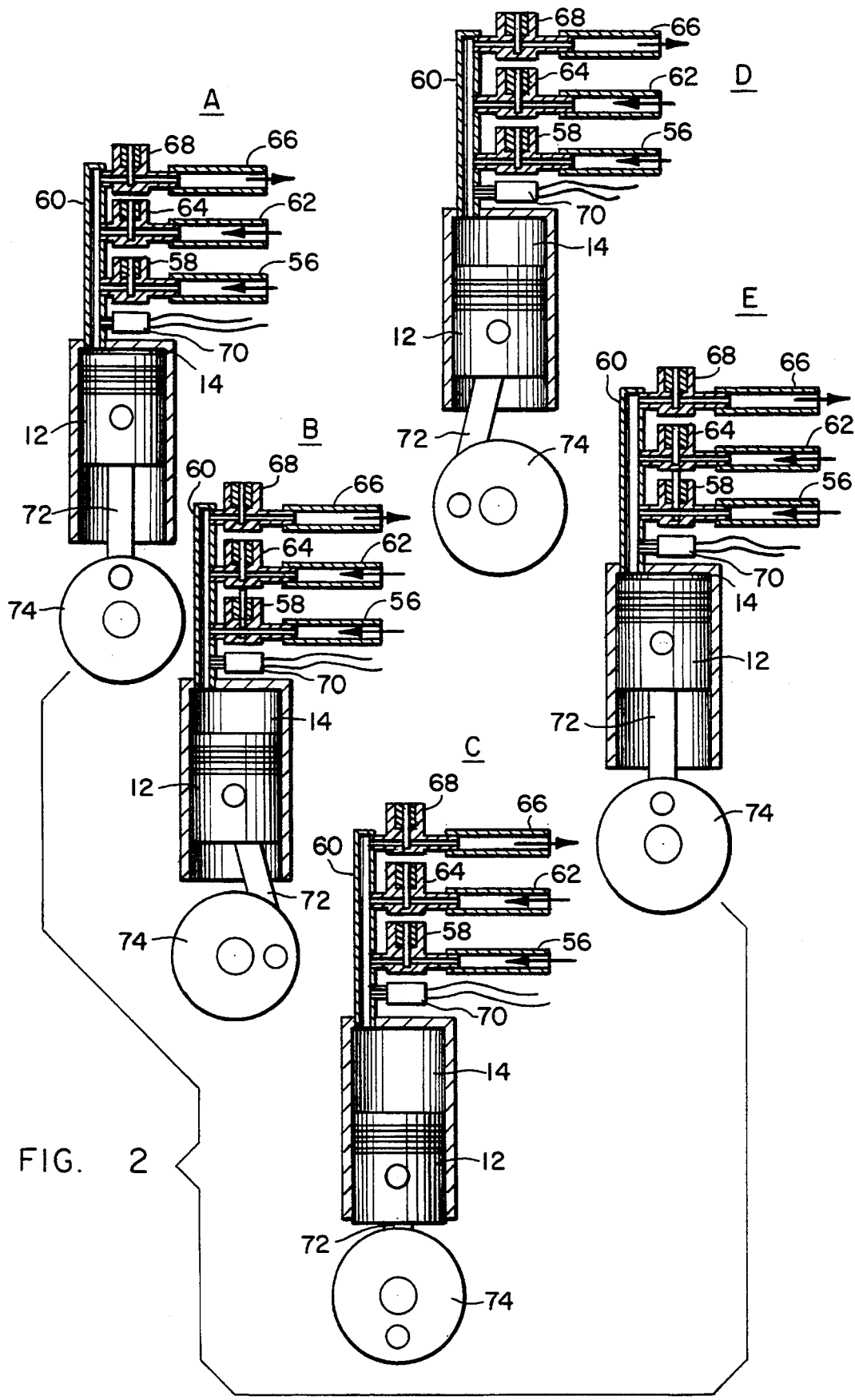
FIG. 2 is a schematic diagram illustrating in five stages (A through E) the power and exhaust strokes of a four cycle internal combustion engine when the system of the invention is utilized.
Figure 3:
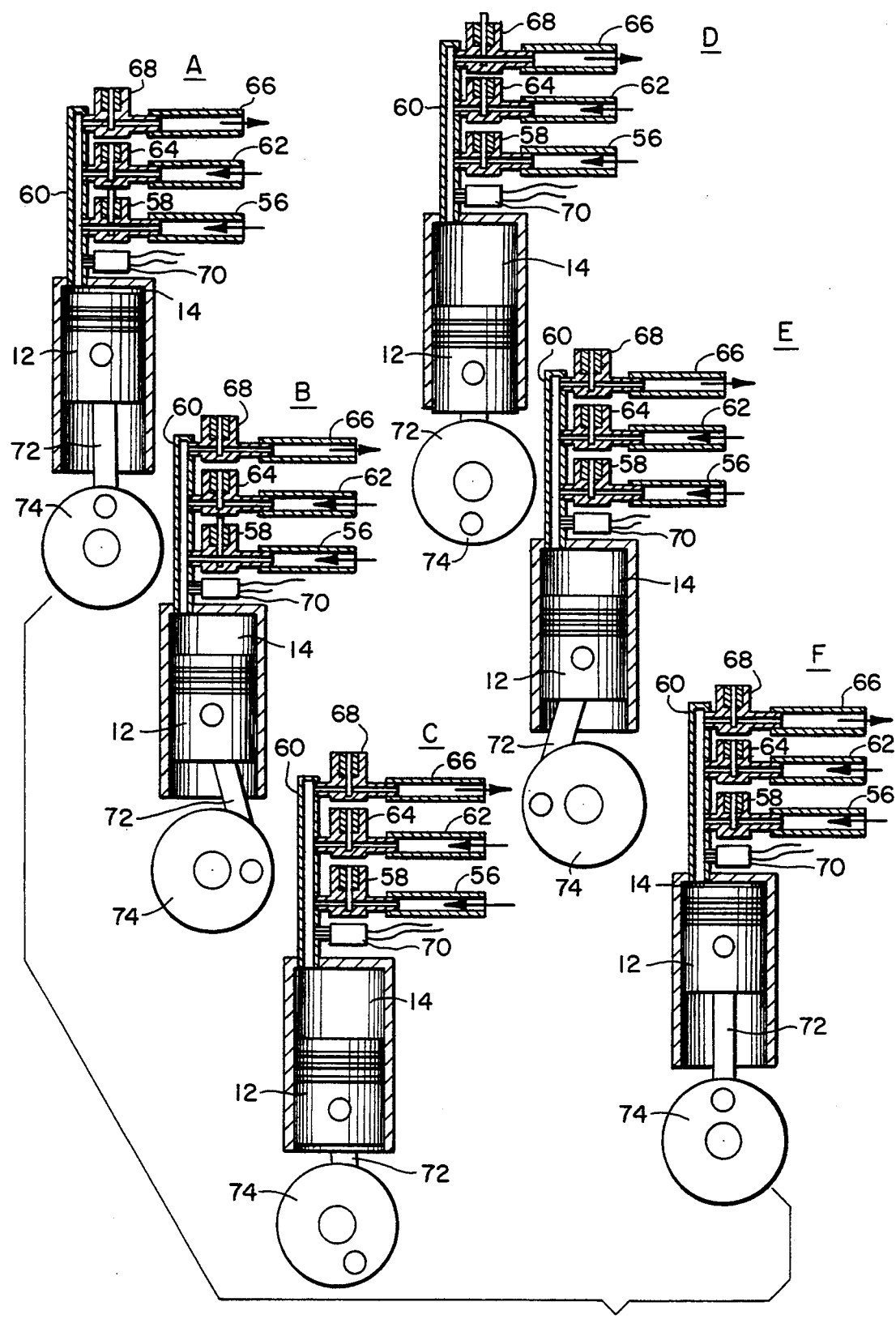
FIG. 3 is a schematic diagram illustrating in six stages (A through F) the intake and compression strokes of the same four cycle internal combustion engine when the system of the invention is utilized.

Referring now to FIGS. 2 and 3, there is illustrated the cycles that occur in a four cycle engine while utilizing the principles of the invention. For each cylinder in the engine 10, the air intake controller 48 includes a high pressure input line 56 and a valve 58 that controls the flow into the intake line 60 to the combustion chamber 14. Intake air controller 48 also includes a free air intake line 62 and a valve 64 which controls flow of the free air from line 62 into the main intake line 60. Intake air control 48 also includes an exhaust air line 66, the flow through which from the main intake line 60 is controlled by valve 68. In addition, a pressure senses 70 continuously sensors the pressure in the intake line 60 and thus in the combustion chamber 14.

FIGS. 2 and 3 also illustrate the various strokes in the engine 10 and schematically show the connecting rod 72 that connects the piston 12 to the crank shaft 74. Also, FIGS. 2 and 3 illustrate the system of the invention, but do not show the system for introducing fuel into the combustion chamber 14, since this system is not modified from the conventional fuel introduction system. The system of the invention, with some modifications, can be used with all types of engines, including naturally aspirated.

Referring now first to FIG. 2, there is illustrated the power and exhaust cycles of a four cycle engine showing the position of the piston in the various stages of these cycles so as to illustrate the principles of the invention. FIG. 2 illustrates five different stages during these two cycles, each stage being designated by one of the letters "A" through "E". In Stage A, the piston 12 is shown at top dead center at which time combustion occurs creating 1100 psi or more in the combustion chamber 14 driving the piston 12 downwardly and creating torque on the crank shaft 74. At this time, valve 58 in the high pressure input line 56 is closed as are the valves 64 and 68 in the free air intake line 62 and exhaust air line 66.

As the piston 12 continues downwardly driven by the combustion in the chamber 14, the pressure in the chamber 14 will rapidly drop. When the pressure in chamber 14 drops to a predetermined pressure, 400 psi for example, pressure sensor 70 will sense the pressure drop and intake air controller 48 will open valve 58 to admit high pressure air into chamber 14 so as to maintain the pressure in chamber 14 at approximately 400 psi or higher. During this time, valve 68 to exhaust air line 66 remains closed. This is illustrated in Stage B of FIG. 2. With the additional pressure maintained in the chamber 14 by reason of the high pressure input line 56, and with the additional fresh air that is provided to the chamber 14, combustion is more complete which creates a better burn and higher temperatures. For example, it is estimated that the temperature in the chamber 14 will be increased over the normal temperature of approximately 1400° F. to about 1700° F. This higher temperature and increased pressure also minimizes condensation that usually occurs in the chamber 14 during the pressure and temperature drop. The additional pressure and better burn will increase the torque, and thus the horsepower, during the power cycle as much as 20 percent over conventional engines.

Stage C illustrates the piston 14 at bottom dead center. At bottom dead center, the conventional exhaust valve of the engine 10 will open and the hotter (and more completely burned) exhaust gases are discharged through exhaust port 18 into the afterburner 28. As previously described, the additional heat is used to convert the engine coolant to steam to drive the air compressor 36. Of course, just prior to opening of the conventional exhaust valve, valve 58 in the high pressure input line 56 will be closed along with the valve 64 in the free air intake line 62 as well as the valve 68 in the exhaust air line 66 which has remained closed during the power and exhaust strokes.

Stage E of FIG. 2 illustrates the piston 12 approaching top dead center at which point the intake stroke commences. At this time, valve 58 in the high pressure intake line 56 once again opens to allow high pressure air at approximately 400 psi or greater to be injected into the chamber 14. At this time, valve 64 in the free air intake line 62 is closed as is the valve 68 in the exhaust air line 66. Injection of high pressure air during the intake stroke creates additional torque and horsepower as if the engine were in its power stroke. In the normal engine, no torque, and thus no power, is created during the intake stroke.

Referring now to FIG. 3, Stages A illustrates the start of the intake stroke with the piston 12 just beyond top dead center, and the valve 58 opens allowing the high pressure intake air 56 to enter the chamber 14. Injection of high pressure air into chamber 14 through the high pressure intake line 56 continues through Stage B so that pressure in chamber 14 is maintained at a minimum of 400 psi throughout the entire intake stroke. This increases the torque and horsepower during this stroke as much as 100 percent, since the conventional engine derives no torque during the intake stroke. This also makes the engine 10 run much smoother.

Stage C of FIG. 3 shows the piston 12 approaching bottom dead center at which point the valve 58 closes. During Stages A, B and C, valves 64 and 68 remain closed.

Stage D of FIG. 3 shows the piston 12 at or a little beyond bottom dead center at which time valve 68 to the exhaust air line 66 is opened to relieve the pressure to a pre-set amount, e.g., 40 psi, at which time the valve 68 will close so as to maintain the pre-set minimum pressure. Stage E of FIG. 3 illustrates the piston 12 approximately 90° ahead of top dead center and illustrates that a minimum pre-set pressure is maintained throughout the compression stroke similar to that in conventional engines if a turbo charger is used. Since a minimum pre-set pressure is maintained, greater torque is achieved. Stage E illustrates that piston 12 at top dead center which is the completion of the intake and compression strokes but with a minimum pre-set pressure maintained in the chamber 14. At this time, the four cycles are completed, and the piston is once again at top dead center ready to commence the enhanced power stroke which is illustrated starting with Stage A of FIG. 2.

If the invention is utilized in connection with an air-cooled engine, it will be understood that a separate, closed system for circulating a liquid through the heat exchanger 24 will be provided to absorb the heat produced by combustion, including the heat energy in the lubricating oil, the engine block and the engine exhaust. The liquid circulated in such a closed system is used to produce the superheated vapor that drives the air compressor 36 in the same manner as described in the preferred embodiment in connection with a liquid-cooled engine.

From the foregoing description of the invention, it will be appreciated that the properly timed introduction of high pressure air into the combustion chamber of an internal combustion engine can provide significant additional power to the drive train of the engine. Some of this power is provided on the intake cycle, which in the conventional engine produces no torque. In addition, the properly timed introduction of the high pressure air serves to supplement the power output during the power cycle, and also permits a larger fuel air mixture to be introduced into the combustion chamber resulting in more complete combustion. This more complete combustion results in less unburned fuel and other contaminants in the exhaust gases. Also, the remaining unburned fuel of the exhaust gases are burned in an afterburner to supply additional heat to the heat exchanger.

It should also be understood that the principles of the invention can be utilized in a multi-cylinder engine by momentarily shutting off the fuel supply sequentially to one or more cylinders and introducing the high pressure air in that cylinder in a way that will produce a mean effective pressure approaching the mean effective pressure produced by combustion of the fuel in that cylinder.

It will be further appreciated that by employing the principles of the invention, the energy necessary to produce the high pressure air is provided entirely by utilizing the otherwise wasted heat from the engine exhaust and engine oil and coolant, which heat is used to produce steam that drives the air compressor. It will be further evident from the foregoing description that the substantially increased efficiency of the internal combustion engine is accomplished using the principles of the invention but with a minimum amount of modification to conventional engine design. Existing engines can be modified to utilize the principles of the invention, and engines can be originally manufactured to incorporate the system of the invention. The invention has been illustrated in connection with the preferred embodiment thereof which shows a system of components, many of which are standard components that are commercially available. Selection of the components, and the various valves and other components necessary to control the properly timed introduction of the high pressure air as well as the operation of the entire system are within the design skills of those skilled in the art. However, having described a preferred embodiment of the invention, it will be evident to those skilled that revisions and modifications that can be made to the preferred embodiment without departing from the principles of the invention. It is our intention however that all such revisions and modifications that are obvious to those skilled in the art will be included within the scope of the following claims.

What is claimed is as follows:

1. An energy saving system for improving the efficiency and lowering the exhaust emissions of an internal combustion engine having a plurality of cycles, including an exhaust cycle, during which fuel introduction means and an air intake introduce fuel and air into a combustion chamber for combustion in the chamber after which the exhaust gases are discharged from the chamber during the exhaust cycle, the engine also having an exhaust system for receiving and discharging the exhaust gases from the combustion chamber, a lubricating system utilizing a lubricating oil, and a cooling system for removing heat from the engine produced by combustion in the combustion chamber, said energy saving system comprising:

a heat exchanger combined with the engine exhaust system for receiving the exhaust gases from the engine exhaust system;

a closed-loop circulating system for circulating a working liquid under pressure through the heat exchanger;

means for passing the working liquid in the circulating system under pressure through the heat exchanger so as to transfer heat from the exhaust gases into the working liquid and convert the working liquid into vapor;

an air compressor for receiving air from the air intake and producing high pressure air;

the circulating system including means to introduce the vapor produced in the heat exchanger into the air compressor so as to power the air compressor; and air control means for controllably introducing the high pressure air into the combustion chamber of the engine during the entire time of at least one of the cycles of the engine other than the exhaust cycle and for maintaining a predetermined minimum pressure in said chamber during the entire time of said one cycle by continuing the introduction of said high pressure air during the entire time of said cycle so as to increase the power produced by the engine.

2. The energy saving system of claim 1 in which there is an afterburner combined with the engine exhaust system and the heat exchanger, the afterburner receiving the exhaust gases from the engine exhaust system and discharging them into the heat exchanger, and means is combined with the afterburner to introduce air from the air intake into the afterburner to ignite unburned fuel in the exhaust gases.

3. The energy saving system of claim 2 in which the afterburner includes electrical means for igniting the unburned fuel in the exhaust gases.

4. The energy saving system of claim 1 in which there is combined with the air control means and the air compressor an air storage tank, said tank receiving the high pressure air from the air compressor and discharging the high pressure air into the combustion chamber of the engine under control of the air control means.

5. The energy saving system of claim 1 in which the air control means includes pressure sensing means for continuously sensing the pressure in the combustion chamber and also includes valve means for controlling the introduction into and the exhaust of air from the combustion chamber, said valve means being operable in response to the air control means.

6. The energy saving system of claim 1 in which the engine cooling system is a liquid cooling system having a liquid coolant circulating through the engine and includes a radiator through which the liquid coolant is circulated, and the circulating system includes and is combined with the engine cooling system so as to circulate the engine coolant as the working liquid through the heat exchanger.

7. The energy saving system of claim 6 in which the lubricating system includes an oil cooler, and the engine coolant is circulated through the oil cooler to absorb heat from the oil prior to circulation of the coolant through the heat exchanger.

8. The energy saving system of claim 1 in which the engine is air-cooler by air cooling means, and means is provided to capture the heat from the air cooling means and to introduce the heat so captured into the heat exchanger.

9. The energy saving system in any one of claims 1, 2, 3, 4, 5, 6, 7 or 8 in which the internal combustion engine is a compression ignition engine.

10. The energy saving system in any one of claims 1, 2, 3, 4, 5, 6, 7 or 8 in which the internal combustion engine is a spark ignition engine.

11. The energy saving system in any one of claims 1, 2, 3, 4, 5, 6, 7 or 8 in which the internal combustion engine is a two-cycle engine.

12. The energy saving system in any one of claims 1, 2, 3, 4, 5, 6, 7 or 8 in which the internal combustion engine is a four-cycle engine.

13. A method for improving the efficiency and lowering the exhaust emissions of an internal combustion engine having a plurality of cycles, including an exhaust cycle, during which fuel introduction means and an air intake introduce fuel and air into a combustion chamber for combustion in the chamber after which the exhaust gases are discharged from the chamber during the exhaust cycle, the engine also having an exhaust system for discharging the exhaust gases from the combustion chamber, a lubricating system utilizing a lubricating oil, and a cooling system for removing heat from the engine produced by combustion in the combustion chamber, said method comprising:

providing a heat exchanger;

passing the engine exhaust gases through the heat exchanger;

providing a closed-loop circulating system for circulating a working liquid under pressure through the heat exchanger;

circulating the working liquid in the closed-loop circulating system through the heat exchanger;

converting the working liquid circulating through the heat exchanger into vapor by utilizing the heat from the exhaust gases flowing through the heat exchanger;

providing an air compressor for receiving air from the air intake and producing high pressure air;

introducing air from the air intake into the air compressor;

powering the air compressor with the vapor produced in the heat exchanger so as to pressurize the air from the air intake;

introducing the high pressure air from the air compressor into the combustion chamber of the engine during the entire time of at least one of the cycles of the engine other than the exhaust cycle; and maintaining a predetermined minimum pressure in said combustion chamber during the entire time of said one cycle by continuing the introduction of said high pressure air during the entire time of said cycle so as to increase the power produced by the engine.

14. The method of claim 13 in which there is provided an afterburner combined with the engine exhaust system and the heat exchanger, the exhaust gases from the engine exhaust system are introduced into the afterburner and discharged into the heat exchanger, and air is introduced from the engine air intake into the afterburner to ignite unburned fuel in the exhaust gases.

15. The method of claim 14 in which the afterburner includes electrical means for igniting the unburned fuel in the exhaust gases.

16. The method of claim 13 in which the pressure in the combustion chamber is continuously sensed and the pressure so sensed is utilized to control the introduction into and the exhaust of air from the combustion chamber.

17. The method of claim 13 in which the engine cooling system is a liquid cooling system having an engine coolant circulating through the engine and includes a radiator through which the liquid engine coolant is circulated, and the working liquid being circulated through the closed-loop circulating system is the engine coolant.

18. The method of claim 17 in which there is provided an oil cooler in the lubricating system, and the engine coolant is circulated through the oil cooler to absorb heat from the oil prior to circulation of the coolant through the heat exchanger.

19. The method of claim 13 in which the engine is air-cooled by air cooling means, and the heat from the air cooling means is circulated through the heat exchanger.

* * * * *